US011692238B2

(12) United States Patent
Wu et al.

(10) Patent No.: US 11,692,238 B2
(45) Date of Patent: Jul. 4, 2023

(54) METHOD FOR DISPOSAL OF WASTE PRINTED CIRCUIT BOARD THERMAL CRACKING SLAG AND SMELTING SOOT

(71) Applicant: Beijing University of Technology, Beijing (CN)

(72) Inventors: Yufeng Wu, Beijing (CN); Gongqi Liu, Beijing (CN); Bin Li, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 17/625,746

(22) PCT Filed: Nov. 11, 2020

(86) PCT No.: PCT/CN2020/127973
§ 371 (c)(1),
(2) Date: Jan. 8, 2022

(87) PCT Pub. No.: WO2021/129205
PCT Pub. Date: Jul. 1, 2021

(65) Prior Publication Data
US 2023/0037130 A1    Feb. 2, 2023

(30) Foreign Application Priority Data

Dec. 25, 2019    (CN) .......................... 201911359327.7

(51) Int. Cl.
*C22B 1/00*    (2006.01)
*C22B 1/06*    (2006.01)
(Continued)

(52) U.S. Cl.
CPC ................ *C22B 1/06* (2013.01); *C22B 7/007* (2013.01); *C22B 11/042* (2013.01); *C22B 15/0071* (2013.01); *C22B 19/30* (2013.01)

(58) Field of Classification Search
CPC .......... C22B 1/06; C22B 7/007; C22B 11/042; C22B 15/0071; C22B 19/30
See application file for complete search history.

(56) References Cited

FOREIGN PATENT DOCUMENTS

| CN | 1062175 | 6/1992 |
| CN | 101417284 | 4/2009 |

(Continued)

OTHER PUBLICATIONS

"Experiment of Recovery of Valuable Elements from Waste Printed Circuit Boards Smelting Ash by Water Leaching", Gongqi et al., Nonferrous Metals (Extractive Metallurgy), No. 9, Sep. 12, 2019 (Sep. 12, 2019), ISSN: 1007-7545.

(Continued)

*Primary Examiner* — Steven J Bos
(74) *Attorney, Agent, or Firm* — Leonid Kisselev

(57) ABSTRACT

The invention discloses a method for cracking slag and smelting soot of the waste circuit board, belongs to the field of comprehensive recycling of valuable elements from typical soot of waste circuit boards, and particularly relates to a method for cracking slag and smelting soot of the waste circuit board for debromination and comprehensive recovery of copper and zinc. The method includes the following steps of: crushing and sorting, mixture roasting, reinforced leaching, replacement and silver precipitation, sulfuration and copper precipitation, and evaporation crystallization. Compared to traditional recycling technology, the purpose of treating two kinds of solid waste in a coupling mode through one recycling technology is achieved. Through mixed sulfuric acid roasting, the requirement of bromide synergistic removal of the waste circuit board cracking slag and smelting soot is met, and the purpose of selective conversion of copper and zinc is achieved.

4 Claims, 1 Drawing Sheet

(51) Int. Cl.
*C22B 7/00* (2006.01)
*C22B 11/00* (2006.01)
*C22B 15/00* (2006.01)
*C22B 19/30* (2006.01)

(56) References Cited

FOREIGN PATENT DOCUMENTS

| | | |
|---|---|---|
| CN | 101708500 | 5/2010 |
| CN | 106048659 | 10/2016 |
| CN | 107866437 | 4/2018 |
| CN | 108160665 | 6/2018 |
| CN | 108165754 | 6/2018 |
| CN | 109055722 | 12/2018 |
| CN | 109402393 | 3/2019 |
| EP | 3486337 | 5/2019 |
| JP | 2006198448 | 8/2006 |
| KR | 20110113428 | 10/2011 |

OTHER PUBLICATIONS

"Status Analysis on Recycling Technology of Spent Printed Circuit Board" Chen Jing-Jing et al., Modern Chemical History, No. 5. Section 39, May 2019 (Sep. 12, 2019) ISSN: 0253-4320.

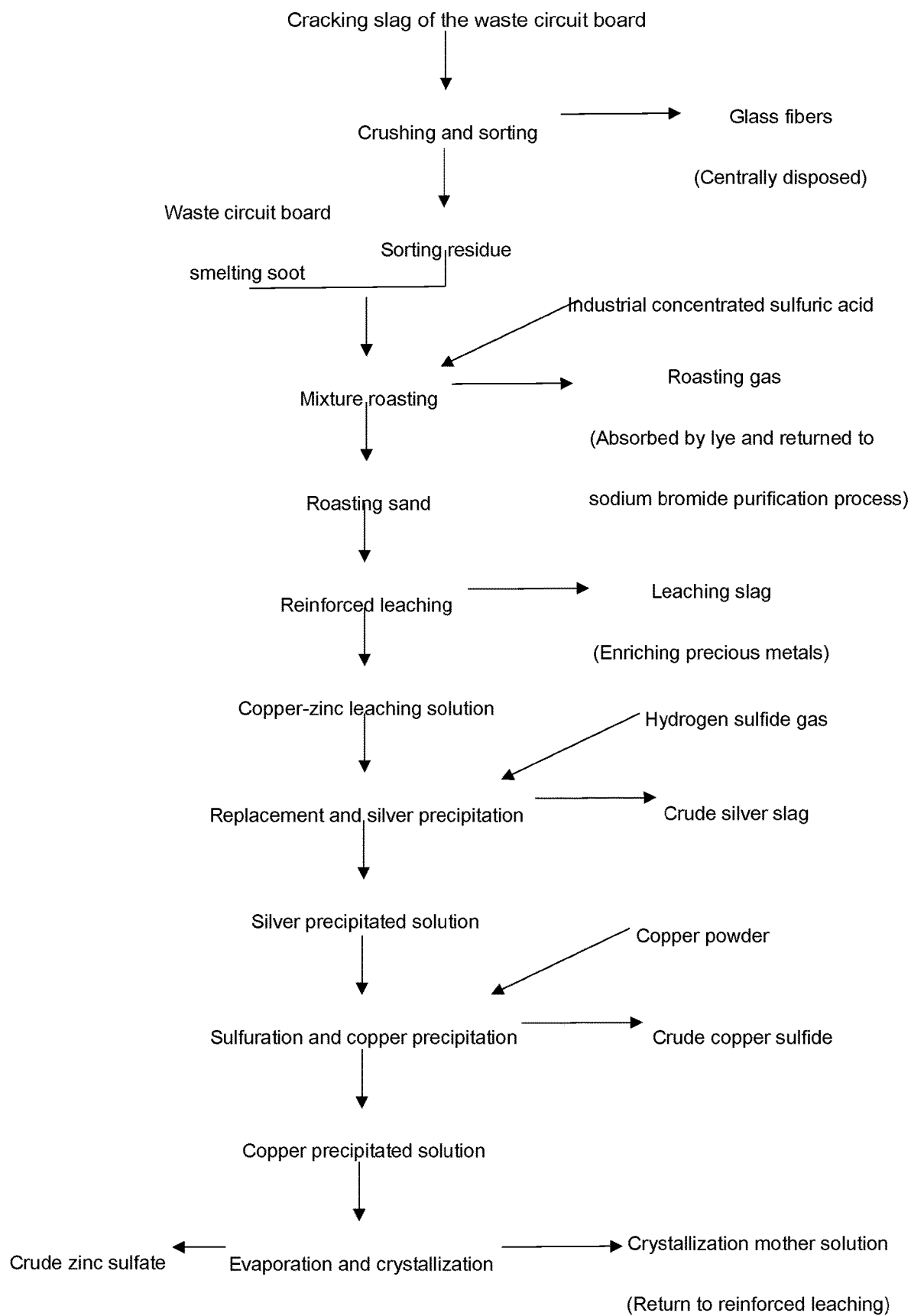

METHOD FOR DISPOSAL OF WASTE PRINTED CIRCUIT BOARD THERMAL CRACKING SLAG AND SMELTING SOOT

CROSS-REFERENCE TO RELATED APPLICATIONS

This patent application is the U.S. National Phase patent application under 35 U.S.C. § 371, which claims priority to International Application No. PCT/CN2020/127973, filed on Nov. 11, 2020, which in turn claims the benefit of priority to Chinese Patent Application No. 201911359327.7, filed on Dec. 25, 2019, the disclosures of which are incorporated by reference herein.

TECHNICAL FIELD

The invention belongs to the field of comprehensive recycling of valuable elements from typical soot of waste circuit boards, and particularly relates to a method for cooperative disposal of waste printed circuit board thermal cracking slag and smelting ash for debromination and comprehensive recovery of copper and zinc.

BACKGROUND

Waste circuit boards are components with high recycling value produced in the process of dismantling waste electronic appliances, and their disposal is the core of high-value utilization of electronic appliances.

Flame retardants contained in waste circuit boards are generally brominated epoxy resin, tetrabromobisphenol A type reactive bromine-containing flame retardants, with a bromine content of 5-15%. Such flame retardants are generally chemically bonded with the resin materials in the circuit board, so under the normal use condition, the brominated flame retardant is safe and stable. However, in the process of circuit board recovery, it is easy to cause the loss and decomposition of brominated flame retardants and lead to serious environmental pollution if not handled properly. At the same time, bromine is an important chemical raw material. Therefore, how to recover this bromine from bromine-containing flame retardants is a problem that needs to be solved in the current waste circuit board processing industry and the entire flame retardant electronic plastic recycling field. The resin in the waste circuit board is mostly thermosetting material, which cannot be recycled and treated by the general physical melting and regeneration technology. Incineration, smelting, pyrolysis and other fire methods are considered to be the most effective technology for recycling waste circuit boards.

However, the fire disposal process often produces certain solid residues, such as waste circuit board cracking slag and smelting/incineration soot. These typical slags and soot not only contain a large amount of valuable metals such as copper, lead, zinc, gold, silver, etc., but are also affected by heating conditions and often contain inorganic bromides which is difficult to handle. The main components are shown in Table 1, so waste circuit boards smelting cracking slag and smelting soot have certain common problems. However, these metal bromides are chemically stable, and it is difficult to use traditional acids, alkalis, and salts for separation and recovery. Therefore, it is necessary to remove the bromine in advance while recovering valuable metals in waste circuit board cracking slag and smelting soot.

TABLE 1

Elemental content of waste circuit board cracking slag and smelting soot

| (wt. %) | Br | Cu | Pb | Zn | Cl | Sn | Ag | Al | Fe |
|---|---|---|---|---|---|---|---|---|---|
| Cracking slag | 25.0 | 24.6 | 5.6 | 17.5 | 7.3 | 4.1 | 0.6 | 1.8 | 0.9 |
| Smelting soot | 10.5 | 39.3 | 8.7 | 20.3 | 10.2 | 6.2 | 0.3 | 2.6 | 1.3 |

Traditional recovery methods of copper-containing smelting soot mainly include fire method and wet method. The fire method is mainly volatilized and enriched lead, zinc, arsenic in smelting furnace with a reducing atmosphere, others elements enter into polymetallic residues. The comprehensive recovery rate of valuable metals in this way is low and Improper treatment of the generated flue gas seriously affects the environment and the health of workers, at the same time, there is a problem of secondary soot disposal. Wet recovery is typically acid leaching-chemical transformation and other methods, mainly for copper, zinc, nickel and other base metals that are easily soluble in acids and alkalis. The obtained leachate is enriched by extraction and stripping or displacement precipitation. Disadvantage of this method is the stock of tail solution is large and difficult to recycle.

Typical recovery method for waste circuit board cracking slag is often through mechanical pulverization and pretreatment, and then use magnetic separation, eddy current separation, or electrical separation to completely separate the metal and non-metal components, and then the recovered metal can be recovered by fire method or wet further treatment. Although this method can be used to initially separate the metals and non-metals in the pyrolysis slag, it has the problems of incomplete separation and low comprehensive utilization rate. Based on the characteristics of the above recovery methods, the existing metallurgical methods for simply recovering valuable metals cannot solve the common problem of inorganic metal bromide in the cracking slag and smelting soot of waste circuit boards. Therefore, it is necessary to develop a new process to solve this problem.

In order to solve this problem, the present invention proposes a process route of crushing and sorting, mixture roasting, reinforced leaching, replacement and silver precipitation, sulfuration and copper precipitation, and evaporation crystallization to co-process waste circuit board cracking slag and smelting soot. The method is simple and easy to implement, and realizes high-efficiency removal of bromide and the high-value utilization of copper and zinc. At the same time, there is no tail solution discharge during the recovery process, which has significant environmental benefits.

SUMMARY

The purpose of the present invention is mainly to solve the problem of co-processing of waste circuit board cracking slag and smelting soot, and to propose a method for of bromine removal by coordinated roasting of cracking residue and smelting soot, reinforced leaching of copper and zinc and high value utilization. The processing method has no tail solution discharge during the recovery process, which has significant environmental benefits.

Specific steps of the invention are as follows:

(1) Crushing and sorting: cracking slag of the waste circuit board is crushed to particles with 0.5-4.5 mm particle size by shear crusher, then adopt electrostatic or shaker sorting to separate metal and nonmetal to obtain glass fibers and sorting residue, then dispose the glass fiber centrally; glass fiber content in sorting residue is 0-5%.

(2) Mixture roasting: mix the sorting residue obtained in step (1) with waste circuit board smelting soot to obtain a mixture; add 98% concentrated sulfuric acid into the obtained mixture with tap water for dilution, wherein every kilogram of sorting residue mixed with 0.5-3.0 kg of waste circuit board smelting soot, the mass ratio of the mixture to sulfuric acid is 2:1-1:2, and the addition amount of tap water is 1-20% of the mass of the mixture or no tap water is added. Then process sulfuric acid roasting under 250-450° C. with 1.5-3.5 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, wherein the concentration of sulfuric acid is 1-20 g/L, or tap water is directly used as the leaching agent. The leaching slag is returned to the process of enriching precious metals; during this process, the liquid-to-solid mass ratio is 3:1-6:1, the leaching temperature is 25-65° C., and the leaching time is 1.0-2.5 hours, stirring speed is 180-360 rpm, ratio of ultrasonic working time to intermittent time is (10-20):10, the ultrasonic power is 25-55 Wh per kilogram of slurry, and the frequency is 5-30 KHz.

(4) Replacement and silver precipitation: add copper powder into copper-zinc leaching solution obtained in step (3) for heating and stirring replacement reaction to obtain crude silver and silver precipitated solution, add 0.3-1.5 g of copper powder per liter copper-zinc leaching solution, the reaction temperature is 50-80° C., and the reaction time is 1.0-3.0 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 0.5-2.0 L/min, 5-20 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The present invention adopts co-processing of waste circuit board cracking slag and smelting soot, it solves the problem that bromine in typical slag has large content differences, which has been not solved by two pyrolysis disposal methods. Through the common coupling, the purpose of disposing two kinds of solid wastes by one process is achieved. In addition, the sulfation roasting not only meets the requirement of bromide high-efficiency removal of waste circuit board cracking slag and smelting soot, but also realizes the purpose of selective conversion of base metal such as copper and zinc. Through reinforced leaching and selective precipitation, high-value products are obtained. The co-processing of these two kinds of wastes provides a reference for the recycling of other low-grade secondary resources.

The invention is especially suitable for the roasting of waste circuit board cracking residue and smelting soot with large difference in inorganic bromide content, the reinforced leaching and directional enrichment of base metals and high value utilization. It has the advantages of short process, simple equipment, no tail solution discharge, remarkable economic and environmental benefits.

BRIEF DESCRIPTION OF THE DRAWINGS

FIG. 1 shows a process flow diagram of a method for cooperative disposal of waste printed circuit board thermal cracking slag and smelting ash.

DETAILED DESCRIPTION

The following embodiments are used to further illustrate the present invention, but not to limit the present invention.

Embodiment 1

(1) Crushing and sorting: cracking slag of the waste circuit board is crushed to particles with 0.5 mm particle size by shear crusher, then adopt electrostatic or shaker sorting to separate metal and nonmetal to obtain glass fibers and sorting residue, then dispose the glass fiber centrally; glass fiber content in sorting residue is 0%.

(2) Mixture roasting: mix the sorting residue obtained in step (1) with waste circuit board smelting soot to obtain a mixture, wherein the mixture contains 16.2% bromine, 32.1% copper and 18.6% zinc; add 98% concentrated sulfuric acid into the obtained mixture with tap water for dilution, wherein every kilogram of sorting residue mixed with 0.5 kg of waste circuit board smelting soot, the mass ratio of the mixture to sulfuric acid is 2:1, no tap water is added. Then process sulfuric acid roasting under 250° C. with 1.5 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, tap water is directly used as the leaching agent. The leaching slag is returned to the process of enriching precious metals; during this process, the liquid-to-solid mass ratio is 3:1, the leaching temperature is 25° C., and the leaching time is 1 hour, stirring speed is 180 rpm, ratio of ultrasonic working time to intermittent time is 10:10, the ultrasonic power is 25 Wh per kilogram of slurry, and the frequency is 5 KHz.

(4) Replacement and silver precipitation: add copper powder into copper-zinc leaching solution obtained in step (3) for heating and stirring replacement reaction to obtain crude silver and silver precipitated solution, add 0.3 g of copper powder per liter copper-zinc leaching solution, the reaction temperature is 50° C., and the reaction time is 1 hour.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 0.5 L/min, 5 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 99.1%, the recovery rate of copper is 98.5%, and the recovery rate of zinc is 97.0%.

Embodiment 2

(1) Crushing and sorting: cracking slag of the waste circuit board is crushed to particles with 4.5 mm particle size by shear crusher, then adopt electrostatic or shaker sorting to separate metal and nonmetal to obtain glass fibers and sorting residue, then dispose the glass fiber centrally; glass fiber content in sorting residue is 5%.

(2) Mixture roasting: mix the sorting residue obtained in step (1) with waste circuit board smelting soot to obtain a mixture, wherein the mixture contains 19.4% bromine, 33.5% copper and 17% zinc; add 98% concentrated sulfuric acid into the obtained mixture with tap water for dilution, wherein every kilogram of sorting residue mixed with 3 kg of waste circuit board smelting soot, the mass ratio of the mixture to sulfuric acid is 1:2, and the addition amount of tap water is 20% of the mass of the mixture. Then process sulfuric acid roasting under 450° C. with 3.5 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, the concentration of sulfuric acid 20 g/L. The leaching slag is returned to the process of enriching precious metals; during this process, the liquid-to-solid mass ratio is 6:1, the leaching temperature is 65° C., and the leaching time is 2.5 hours, stirring speed is 360 rpm, ratio of ultrasonic working time to intermittent time is 20:10, the ultrasonic power is 55 Wh per kilogram of slurry, and the frequency is 30 KHz.

(4) Replacement and silver precipitation: add copper powder into copper-zinc leaching solution obtained in step (3) for heating and stirring replacement reaction to obtain crude silver and silver precipitated solution, add 1.5 g of copper powder per liter copper-zinc leaching solution, the reaction temperature is 80° C., and the reaction time is 3 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 2.0 L/min, 20 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 99.6%, the recovery rate of copper is 98.4%, and the recovery rate of zinc is 97.9%.

Embodiment 3

(1) Crushing and sorting: cracking slag of the waste circuit board is crushed to particles with 1.0 mm particle size by shear crusher, then adopt electrostatic or shaker sorting to separate metal and nonmetal to obtain glass fibers and sorting residue, then dispose the glass fiber centrally; glass fiber content in sorting residue is 1.5%.

(2) Mixture roasting: mix the sorting residue obtained in step (1) with waste circuit board smelting soot to obtain a mixture, wherein the mixture contains 22.9% bromine, 36.8% copper and 19.1% zinc; add 98% concentrated sulfuric acid into the obtained mixture with tap water for dilution, wherein every kilogram of sorting residue mixed with 1 kg of waste circuit board smelting soot, the mass ratio of the mixture to sulfuric acid is 1:1, and the addition amount of tap water is 1% of the mass of the mixture. Then process sulfuric acid roasting under 300° C. with 2 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, the concentration of sulfuric acid 1 g/L. The leaching slag is returned to the process of enriching precious metals; during this process, the liquid-to-solid mass ratio is 4:1, the leaching temperature is 30'C, and the leaching time is 1.5 hours, stirring speed is 200 rpm, ratio of ultrasonic working time to intermittent time is 12:10, the ultrasonic power is 30 Wh per kilogram of slurry, and the frequency is 10 KHz.

(4) Replacement and silver precipitation: add copper powder into copper-zinc leaching solution obtained in step (3) for heating and stirring replacement reaction to obtain crude silver and silver precipitated solution, add 0.5 g of copper powder per liter copper-zinc leaching solution, the reaction temperature is 55° C., and the reaction time is 1.5 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 0.8 L/min, 8 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 98.6%, the recovery rate of copper is 97.3%, and the recovery rate of zinc is 97.7%.

Embodiment 4

(1) Crushing and sorting: cracking slag of the waste circuit board is crushed to particles with 4.0 mm particle size by shear crusher, then adopt electrostatic or shaker sorting to separate metal and nonmetal to obtain glass fibers and sorting residue, then dispose the glass fiber centrally; glass fiber content in sorting residue is 4.5%.

(2) Mixture roasting: mix the sorting residue obtained in step (1) with waste circuit board smelting soot to obtain a mixture, wherein the mixture contains 24.7% bromine, 38.3% copper and 19.7% zinc; add 98% concentrated sulfuric acid into the obtained mixture with tap water for dilution, wherein every kilogram of sorting residue mixed with 2.5 kg of waste circuit board smelting soot, the mass ratio of the mixture to sulfuric acid is 1:2, and the addition amount of tap water is 15% of the mass of the mixture. Then process sulfuric acid roasting under 400° C. with 3 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, the concentration of sulfuric acid 15 g/L. The leaching slag is returned to the process of enriching precious metals; during this process, the liquid-to-solid mass ratio is 5:1, the leaching temperature is 60° C., and the leaching time is 2 hours, stirring speed is 340 rpm, ratio of ultrasonic working time to intermittent time is 18:10, the ultrasonic power is 50 Wh per kilogram of slurry, and the frequency is 25 KHz.

(4) Replacement and silver precipitation: add copper powder into copper-zinc leaching solution obtained in step (3) for heating and stirring replacement reaction to obtain crude silver and silver precipitated solution, add 1.2 g of copper powder per liter copper-zinc leaching solution, the reaction temperature is 75° C., and the reaction time is 2.5 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 1.8 L/min, 18 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 99.4%, the recovery rate of copper is 98.0%, and the recovery rate of zinc is 97.3%.

Embodiment 5

(1) Crushing and sorting: cracking slag of the waste circuit board is crushed to particles with 2.0 mm particle size by shear crusher, then adopt electrostatic or shaker sorting to separate metal and nonmetal to obtain glass fibers and sorting residue, then dispose the glass fiber centrally; glass fiber content in sorting residue is 2.5%.

(2) Mixture roasting: mix the sorting residue obtained in step (1) with waste circuit board smelting soot to obtain a mixture, wherein the mixture contains 18.3% bromine, 25.9% copper and 18.2% zinc; add 98% concentrated sulfuric acid into the obtained mixture with tap water for dilution, wherein every kilogram of sorting residue mixed with 1.5 kg of waste circuit board smelting soot, the mass ratio of the mixture to sulfuric acid is 2:1, and the addition amount of tap water is 10% of the mass of the mixture. Then process sulfuric acid roasting under 320° C. with 2.5 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, the concentration of sulfuric acid 5 g/L. The leaching slag is returned to the process of enriching precious metals; during this process, the liquid-to-solid mass ratio is 3:1, the leaching temperature is 35° C., and the leaching time is 1.5 hours, stirring speed is 260 rpm, ratio of ultrasonic working time to intermittent time is 14:10, the ultrasonic power is 35 Wh per kilogram of slurry, and the frequency is 15 KHz.

(4) Replacement and silver precipitation: add copper powder into copper-zinc leaching solution obtained in step (3) for heating and stirring replacement reaction to obtain crude silver and silver precipitated solution, add 0.8 g of copper powder per liter copper-zinc leaching solution, the reaction temperature is 60° C., and the reaction time is 2.5 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 1.0 L/min, 10 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 98.6%, the recovery rate of copper is 98.8%, and the recovery rate of zinc is 98.1%.

Embodiment 6

(1) Crushing and sorting: cracking slag of the waste circuit board is crushed to particles with 3.0 mm particle size by shear crusher, then adopt electrostatic or shaker sorting to separate metal and nonmetal to obtain glass fibers and sorting residue, then dispose the glass fiber centrally; glass fiber content in sorting residue is 3%.

(2) Mixture roasting: mix the sorting residue obtained in step (1) with waste circuit board smelting soot to obtain a mixture, wherein the mixture contains 22.2% bromine, 31.8% copper and 19.3% zinc; add 98% concentrated sulfuric acid into the obtained mixture with tap water for dilution, wherein every kilogram of sorting residue mixed with 2 kg of waste circuit board smelting soot, the mass ratio of the mixture to sulfuric acid is 1:1, and the addition amount of tap water is 5% of the mass of the mixture. Then process sulfuric acid roasting under 350° C. with 3.5 hours to obtain roasting sand and roasting gas; the roasting gas is absorbed by lye and returned to the sodium bromide purification process.

(3) Reinforced leaching: the roasting sand and sulfuric acid solution obtained in step (2) are mechanically stirred and leached in a batch ultrasonic reactor to obtain the leaching slag and copper-zinc leaching solution, the concentration of sulfuric acid 10 g/L. The leaching slag is returned to the process of enriching precious metals; during this process, the liquid-to-solid mass ratio is 5:1, the leaching temperature is 55° C., and the leaching time is 2 hours, stirring speed is 300 rpm, ratio of ultrasonic working time to intermittent time is 15:10, the ultrasonic power is 40 Wh per kilogram of slurry, and the frequency is 20 KHz.

(4) Replacement and silver precipitation: add copper powder into copper-zinc leaching solution obtained in step (3) for heating and stirring replacement reaction to obtain crude silver and silver precipitated solution, add 1 g of copper powder per liter copper-zinc leaching solution, the reaction temperature is 70° C., and the reaction time is 2 hours.

(5) Sulfuration and copper precipitation: inject hydrogen sulfide gas into silver precipitated solution obtained in step (4) to obtain crude copper sulfide and copper precipitated solution, wherein the flow rate of hydrogen sulfide gas is 1.5 L/min, 15 L of hydrogen sulfide is injected per liter copper precipitated solution.

(6) Zinc extraction by crystallization: the copper precipitated solution obtained in step (5) is evaporated and crystallized to obtain crude zinc sulfate and crystallization mother solution, crystallization mother solution is returned to reinforced leaching process.

The removal rate of bromine is 99.0%, the recovery rate of copper is 99.1%, and the recovery rate of zinc is 98.7%. The above embodiments are only used to illustrate the preferred embodiments of the present invention, but the present invention is not limited to the above-mentioned embodiments. In the scope of knowledge possessed by those skilled in the art, the modifications made in the spirit and principles of the invention, such as substitution and improvement, etc. without violating the science and the thought of the invention, shall be regarded as the scope of protection of this application.

The invention claimed is:

1. A method for disposal of waste printed circuit board thermal cracking slag and smelting soot comprising steps as follows:
   (1) crushing cracking slag of a waste circuit board to particles of 0.5-4.5 mm particle size by a shear crusher, then using one of an electrostatic or shaker sorting to separate metal and nonmetal to obtain glass fibers and sorting residue, then disposing of the glass fiber;
   (2) mixing the sorting residue with waste circuit board smelting soot to obtain a mixture, mixing the obtained mixture with tap water and 98% concentrated sulfuric acid to obtain a sulfuric acid solution, then performing roasting of the sulfuric acid solution at 250-450° C. for 1.5-3.5 hours to obtain roasting sand and roasting gas, wherein the roasting gas is absorbed by lye and returned to a sodium bromide purification process;
   (3) mechanically stirring and leaching in a batch ultrasonic reactor the roasting sand and sulfuric acid solution to obtain a leaching slag and a copper-zinc leaching solution, returning the leaching slag to a process of enriching precious metals, wherein during this leaching step, a liquid-to-solid mass ratio is 3:1-6:1, a temperature of the leaching is 25-65° C., a time of the leaching is 1.0-2.5 hours, an ultrasonic power is 25-55 Wh per kilogram of slurry, and an ultrasonic frequency is 5-30 KHz;
   (4) adding copper powder into the copper-zinc leaching solution for a heating and stirring replacement reaction to obtain crude silver and a silver precipitated solution, wherein 0.3-1.5 g of copper powder is added per liter copper-zinc leaching solution, a temperature of the heating and stirring replacement reaction is 50-80° C., and a time of the heating and stirring replacement reaction is 1.0-3.0 hours;
   (5) injecting hydrogen sulfide gas into the silver precipitated solution to obtain crude copper sulfide and a copper precipitated solution;
   (6) evaporating and crystallizing the copper precipitated solution to obtain crude zinc sulfate and a crystallization mother solution, wherein the crystallization mother solution is returned to the leaching step (3).

2. A method for disposal of waste printed circuit board thermal cracking slag and smelting soot according to claim 1, wherein in step (2), every kilogram of the sorting residue is mixed with 0.5-3.0 kg of waste circuit board smelting soot, wherein a mass ratio of the mixture to the sulfuric acid is 2:1-1:2, and an amount of the tap water is 1-20% of the mass of the mixture.

3. A method for disposal of waste printed circuit board thermal cracking slag and smelting soot according to claim 1, a concentration of sulfuric acid in the sulfuric acid solution in step (3) is 1-20 g/L, the tap water is directly used as a leaching agent, a speed of the stirring in the batch ultrasonic reactor is 180-360 rpm, and a ratio of ultrasonic working time to intermittent time is (10-20):10.

4. A method for disposal of waste printed circuit board thermal cracking slag and smelting soot, according to claim 1, wherein a flow rate of the hydrogen sulfide gas in step (5) is 0.5-2.0 L/min, 5-20 L of hydrogen sulfide is injected per liter of the copper precipitated solution.

* * * * *